US012589797B2

(12) United States Patent
Shan et al.

(10) Patent No.: US 12,589,797 B2
(45) Date of Patent: Mar. 31, 2026

(54) STEERING MECHANISM AND INDEPENDENT SUSPENSION SYSTEM

(71) Applicant: XUZHOU HEAVY MACHINERY CO., LTD., Jiangsu (CN)

(72) Inventors: Zenghai Shan, Jiangsu (CN); Honggang Ding, Jiangsu (CN); Guangguang Cao, Jiangsu (CN); Yunwang Ma, Jiangsu (CN); Dongdong Li, Jiangsu (CN); Liufu Zhao, Jiangsu (CN); Hanwei Zhang, Jiangsu (CN)

(73) Assignee: XUZHOU HEAVY MACHINERY CO., LTD., Jiangsu (CN)

( * ) Notice: Subject to any disclaimer, the term of this patent is extended or adjusted under 35 U.S.C. 154(b) by 436 days.

(21) Appl. No.: 18/284,071

(22) PCT Filed: Apr. 15, 2021

(86) PCT No.: PCT/CN2021/087485
§ 371 (c)(1),
(2) Date: Sep. 26, 2023

(87) PCT Pub. No.: WO2022/205511
PCT Pub. Date: Oct. 6, 2022

(65) Prior Publication Data
US 2024/0158002 A1     May 16, 2024

(30) Foreign Application Priority Data
Mar. 29, 2021     (CN) .......................... 202110331010.3

(51) Int. Cl.
*B62D 5/06* (2006.01)
*B60G 11/26* (2006.01)
(Continued)

(52) U.S. Cl.
CPC .............. *B62D 5/20* (2013.01); *B60G 11/265* (2013.01); *B60G 11/27* (2013.01); *B60G 2200/18* (2013.01)

(58) Field of Classification Search
CPC .............. B62D 5/06; B62D 5/20; B62D 7/08
See application file for complete search history.

(56)     References Cited

U.S. PATENT DOCUMENTS 9,796,233 B2 * 10/2017 Ding ...................... B60G 13/08
9,981,688 B2 * 5/2018 Ding ...................... B62D 7/144
(Continued)

FOREIGN PATENT DOCUMENTS

CN     201677925     12/2010
CN     202147715     2/2012
(Continued)

OTHER PUBLICATIONS

"Office Action of China Counterpart Application", issued on Nov. 29, 2021, pp. 1-5.
(Continued)

*Primary Examiner* — Long T Tran
(74) *Attorney, Agent, or Firm* — JCIPRNET

(57)     ABSTRACT

The invention discloses a steering mechanism and an independent suspension system. The steering mechanism comprises a steering rocker arm unit, a mid-position locking cylinder, a first power steering cylinder, a second power steering cylinder, a first steering linkage and a second steering linkage; one end of the mid-position locking cylinder is connected with the steering rocker arm unit, and the other end is hinged to a frame; one ends of the first power steering cylinder and the second power steering cylinder are connected with the steering rocker arm unit, and the other ends are hinged to the frame; and one ends of the first steering linkage and the second steering linkage are con-
(Continued)

nected with the steering rocker arm unit, the other ends are connected with knuckle arms, and the knuckle arm is fixed on a wheel rim.

11 Claims, 7 Drawing Sheets

(51) Int. Cl.
    *B60G 11/27*     (2006.01)
    *B62D 5/20*     (2006.01)

(56) References Cited

U.S. PATENT DOCUMENTS

| | | | | |
|---|---|---|---|---|
| 10,583,860 | B2 * | 3/2020 | Shan | B62D 7/166 |
| 2010/0117346 | A1 * | 5/2010 | Bauer | B62D 49/0628 |
| | | | | 280/758 |
| 2014/0138167 | A1 * | 5/2014 | Bebernes | B62D 5/093 |
| | | | | 180/6.48 |
| 2016/0375738 | A1 * | 12/2016 | Ding | B60G 13/08 |
| | | | | 280/124.145 |
| 2017/0015352 | A1 * | 1/2017 | Uranaka | B62D 7/18 |
| 2017/0137058 | A1 * | 5/2017 | Ding | B62D 5/26 |
| 2017/0341682 | A1 * | 11/2017 | Shan | B62D 7/06 |
| 2019/0263448 | A1 * | 8/2019 | Lukka | B62D 13/04 |
| 2019/0329819 | A1 * | 10/2019 | Shan | B62D 5/12 |
| 2022/0266905 | A1 * | 8/2022 | Krone | B62D 7/06 |

FOREIGN PATENT DOCUMENTS

| | | |
|---|---|---|
| CN | 103465955 | 12/2013 |
| CN | 103738136 | 4/2014 |
| CN | 103963825 | 8/2014 |
| CN | 108327787 | 7/2018 |
| CN | 110282009 | 9/2019 |
| JP | H09226614 | 9/1997 |

OTHER PUBLICATIONS

"Office Action of China Counterpart Application", issued on Jun. 22, 2022, pp. 1-5.
"International Search Report (Form PCT/ISA/210) of PCT/CN2021/087485," mailed on Sep. 28, 2021, with English translation thereof, pp. 1-5.

* cited by examiner

STEERING MECHANISM AND INDEPENDENT SUSPENSION SYSTEM

CROSS-REFERENCE TO RELATED APPLICATION

This application is a 371 of international application of PCT application serial no. PCT/CN2021/087485, filed on Apr. 15, 2021, which claims the priority benefit of China application no. 202110331010.3, filed on Mar. 29, 2021. The entirety of each of the above-mentioned patent applications is hereby incorporated by reference herein and made a part of this specification.

BACKGROUND

Technical Field

The invention belongs to the technical field of engineering machinery, and particularly relates to a steering mechanism and an independent suspension system.

Description of Related Art

An automobile suspension serves not only as a power transmission component connecting a frame and an axle, but also as an important element for ensuring driving safety. Each wheel is individually mounted on the frame or axle through a set of suspensions, with the axle adopting a disconnecting design, where a middle section is fixed to the frame. This type of suspension, known as independent suspension, offers numerous advantages: wheels on two sides are able to move independently without affecting each other, ensuring smooth car travel and tyre traction; furthermore, the independent suspension provides ample space for wheel movement, eliminating direct interaction between the left and right wheels, and this effectively reduces body inclination and vibration of a car, decreases stiffness, and ultimately improves the overall ride comfort.

Currently, the independent suspension structure is widely employed in all-terrain crane chassis. The independent suspension structure mainly comprises a guiding mechanism, a damping device and an elastic element. The guiding mechanism determines a motion trajectory of a jumping wheel and changes in wheel positioning parameters, as well as the positions of front and back rolling centers and a pitching center of the car, thus significantly affecting the handling stability and anti-pitching capability of the car. The function of the damping device is to absorb the energy of vertical vibration of the suspension and convert it into heat energy to be dissipated, so that the vibration can be rapidly attenuated. The elastic element is mainly used for mitigating impacts, which mainly depends on the elastic deformation of the elastic element and the tyre.

FIG. 1A and FIG. 1B show an independent suspension system currently used in an all-terrain crane. The suspension comprises a disconnected axle, a suspension cylinder and a steering mechanism. The suspension cylinder is fixed between a wheel rim and the frame. An upper end of the suspension cylinder is fixed to the frame by flange bolts, and a lower end is fixed to an axle rim by bolts around the cylinder. The suspension cylinder can locate the tyre, cushion the impact from the road surface, and avoid the friction between a piston rod of the suspension cylinder and a guide sleeve caused by tyre jumping. A V-shaped thrust rod is connected to the wheel rim through a central ball hinge, and to a main reducer through a fulcrum hinge, providing lateral positioning and improving the lateral stiffness of the suspension. The main reducer is connected with a wheel rim reduction mechanism through a transmission shaft, and an upper end face of the main reducer is fixedly connected with the frame through bolt connection. The steering mechanism also adopts a disconnecting design, and a steering trapezoid consists of three steering linkages, two steering rocker arms and two knuckle arms. The steering linkages at two sides are connected to the steering rocker arms and the knuckle arms, the middle steering linkage is connected to the left and right rocker arms, and the steering rocker arms are fixed on rocker arm supports, as shown in FIG. 2. The knuckle arms are mounted between the wheel rim and the center ball hinge of the V-shaped thrust rod and fixed by bolts. When the wheel turns, a power steering cylinder drives the steering rocker arms to rotate, the steering rocker arms drive the steering linkages, the steering linkages drive the knuckle arms, and the knuckle arms drive the wheel rim to rotate, thus realizing wheel steering.

It can be seen that in the existing independent suspension system, in order to meet the steering requirements, it is necessary to mount the rocker arm supports at the bottom of the frame to fix the rocker arms and bear the force on the rocker arms during steering. In addition, the left and right steering rocker arms each comprise an upper arm and a lower arm, and both arms are fixed on a rocker arm sleeve to realize synchronous rotation. The rocker arm supports and the rocker arm sleeve increase the overall weight of the system, occupy a significant amount of mounting space, and increase assembly complexity and economic costs. The suspension cylinder is connected to a cylinder support on the frame through a bearing bush. The complex structure of the bearing bush poses challenges in assembly and increases economic costs. Furthermore, the cylinder support comprises an upper bottom plate and two side vertical plates, resulting in substantial weight and volume.

SUMMARY

In view of the above problems, the invention provides a steering mechanism and an independent suspension system, which eliminates a rocker arm sleeve and rocker arm supports.

This significantly reduces the overall weight, reduces the required space for the steering mechanism, allows for a more compact arrangement of components, simplifies the manufacturing process, and reduces economic costs.

In order to achieve the above technical objectives and technical effects, the invention is realized by the following technical scheme.

In a first aspect, the invention provides a steering mechanism, comprising:

a steering rocker arm unit;

a mid-position locking cylinder, with one end connected with the steering rocker arm unit and the other end hinged to a frame;

a first power steering cylinder and a second power steering cylinder which are oppositely arranged, with one end of each connected with the steering rocker arm unit and the other end hinged to the frame; and a first steering linkage and a second steering linkage which are oppositely arranged, with one end of each connected with the steering rocker arm unit and the other end connected with a knuckle arm, the knuckle arm being fixed on a wheel rim.

Optionally, when the steering mechanism is a double-rocker arm three-linkage structure, the steering rocker arm unit comprises:

two type I rocker arm brackets fixed on a lower bottom surface of the frame;

a third steering linkage; and a first type I steering rocker arm and a second type I steering rocker arm, which are respectively connected with two ends of the third steering linkage and the type I rocker arm brackets;

the first type I steering rocker arm is also connected with the first power steering cylinder and the first steering linkage;

the second type I steering rocker arm is also connected with the second power steering cylinder and the second steering linkage; and the mid-position locking cylinder is connected with the first type I steering rocker arm or the second type I steering rocker arm.

Optionally, when the steering mechanism is a single-rocker arm two-linkage structure, the steering rocker arm unit comprises:

a type II rocker arm bracket fixed on a lower bottom surface of the frame; and a type II steering rocker arm connected with the type II rocker arm bracket, two ends of one side of the type II steering rocker arm being respectively connected with the first power steering cylinder and the first steering linkage, and two ends of the other side being respectively connected with the second power steering cylinder and the second steering linkage; and the mid-position locking cylinder is connected with the type II steering rocker arm.

In a second aspect, the invention provides an independent suspension system, comprising:

a frame;

two oppositely arranged wheel rims;

two oppositely arranged suspension cylinders, with one end of each connected with the frame and the other end connected with the corresponding wheel rim;

an input flange connected with an inter-wheel transmission shaft;

a main reducer connected with the input flange and fixed at a bottom of the frame, an output end of the main reducer being connected with the wheel rim through a transmission shaft;

a first thrust rod and a second thrust rod which are oppositely arranged, with one end of each connected with the wheel rim and the other end connected with the main reducer; and the steering mechanism as described in any part of the first aspect connected with the wheel rim and the frame.

Optionally, the input flange has a below-center offset to increase the distance between the inter-wheel transmission shaft and the frame; or a main reducer bracket is arranged between the frame and the main reducer to increase the distance between the inter-wheel transmission shaft and the frame.

Optionally, when the steering mechanism is a double-rocker arm three-linkage structure, the knuckle arm is fixed between the wheel rim and the suspension cylinder, and one ends of the first power steering cylinder, the second power steering cylinder and the mid-position locking cylinder are all hinged to a lower bottom surface of the frame; and the type I rocker arm bracket is fixed on the lower bottom surface of the frame.

Optionally, when steering is required, the mid-position locking cylinder does not work, the first power steering cylinder or the second power steering cylinder controls the first type I steering rocker arm and the second type I steering rocker arm to rotate through expansion and contraction, then the knuckle arms are driven by the first steering linkage and the second steering linkage, and then the knuckle arms drive the wheel rims to realize wheel steering; and when a rear axle needs to be locked, the mid-position locking cylinder works to lock the steering mechanism.

Optionally, when the steering mechanism is a single-rocker arm two-linkage structure, the knuckle arm is fixed between the wheel rim and the suspension cylinder, and one ends of the first power steering cylinder, the second power steering cylinder and the mid-position locking cylinder are all hinged to a lower bottom surface of the frame; and the type II rocker arm bracket is fixed on the lower bottom surface of the frame.

Optionally, when steering is required, the mid-position locking cylinder does not work, the first power steering cylinder or the second power steering cylinder controls the type II steering rocker arm to rotate through expansion and contraction, then the knuckle arms are driven by the first steering linkage and the second steering linkage, and then the knuckle arms drive the wheel rims to realize wheel steering; and when a rear axle needs to be locked, the mid-position locking cylinder works to lock the steering mechanism.

Optionally, the suspension cylinder comprises an adapter base, a cylinder block, a sleeve and a foundation which are connected in sequence, a cylinder bracket is hinged to a top of the adapter base, the cylinder bracket is connected with the frame, and the foundation is connected with the wheel rim.

Optionally, a cross section of the frame is in the shape of an inverted trapezoid or irregular polygon.

Compared with the prior art, the invention has the following beneficial effects.

The invention eliminates a rocker arm sleeve and rocker arm supports. This significantly reduces the overall weight, reduces the required space for the steering mechanism, allows for a more compact arrangement of components, simplifies the manufacturing process, and reduces economic costs.

Further, based on the existing relationship between the main reducer and the input flange, the input flange is rotated by 180 degrees to generate a below-center offset, or the main reducer bracket is arranged between the main reducer and the lower bottom surface of the frame. This ensures that the rotational direction of the inter-wheel transmission shaft and the wheel remains unchanged while increasing the distance between the inter-wheel transmission shaft and the frame, thereby providing sufficient space for the arrangement of the steering mechanism.

Further, the invention changes the connection mode between the suspension cylinder and the frame from original flange bolt fixation to pin shaft connection, thereby reducing the assembly difficulty, reducing the weight of the cylinder bracket, reducing the economic costs and improving the reliability.

Further, the invention adopts the inverted trapezoid or irregular polygon-shaped frame, which increases the side area of the frame and creates additional space between the frame and the suspension cylinder, thereby providing sufficient space for hydraulic piping, pneumatic piping, and other systems.

BRIEF DESCRIPTION OF THE DRAWINGS

In order to make the contents of the invention more clearly understood, the invention will be further described in detail according to specific embodiments and the attached drawings.

DESCRIPTION OF THE EMBODIMENTS

Figure 1A:
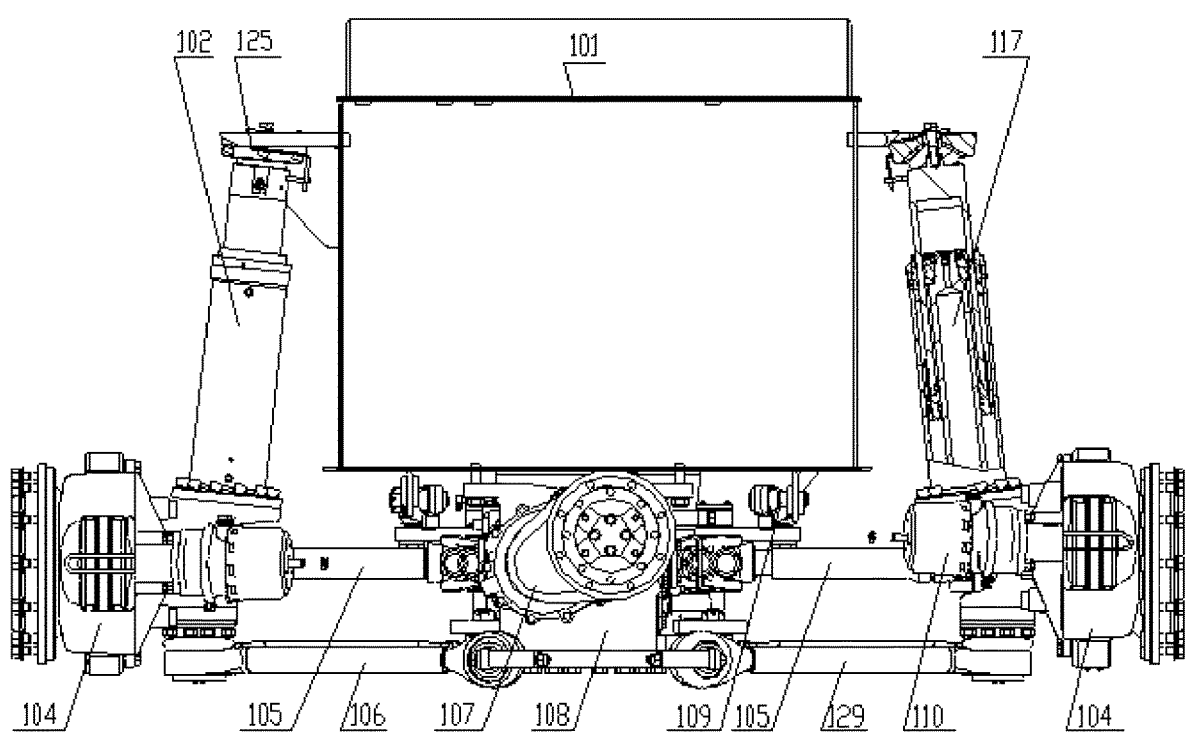
FIG. 1A is a first structural diagram of an independent suspension system currently used in an all-terrain crane.
Figure 1B:
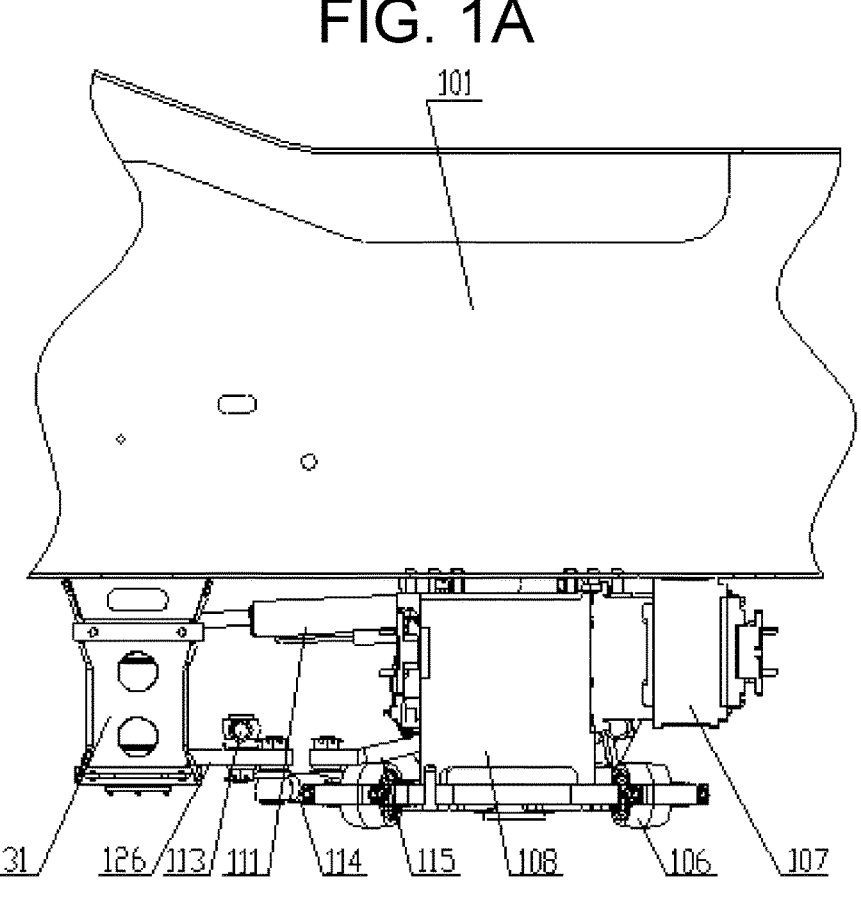
FIG. 1B is a second structural diagram of an independent suspension system currently used in an all-terrain crane.
Figure 2:
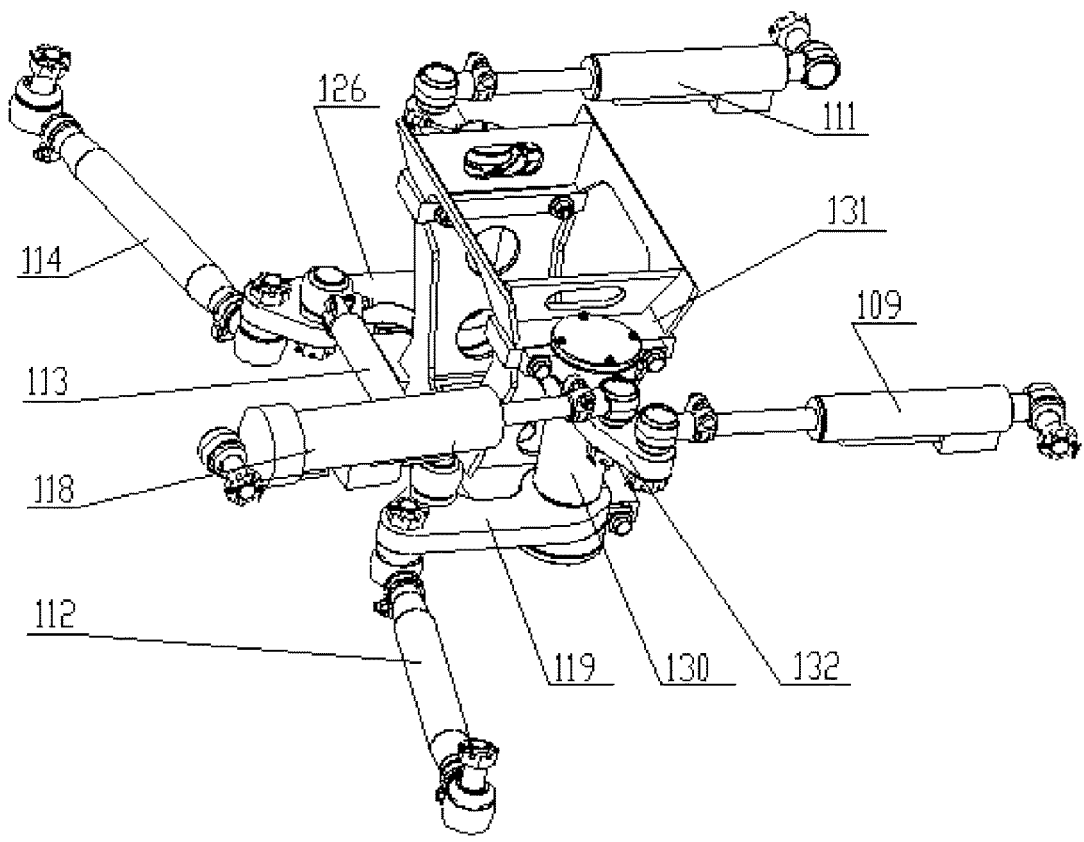
FIG. 2 is a structural diagram of a steering mechanism in the prior art.

In order to make the object, technical scheme and advantages of the invention clearer, the following detailed description of the invention is given in conjunction with embodiments. It should be understood that the specific embodiments described here are only for explaining the invention, and do not limit the protection scope of the invention.

The application principle of the invention will be described in detail with reference to the attached drawings.

Embodiment 1

The embodiment of the invention provides a steering mechanism, comprising:

a steering rocker arm unit;

a mid-position locking cylinder 18, with one end connected with the steering rocker arm unit and the other end hinged to a frame 1;

a first power steering cylinder 9 and a second power steering cylinder 11 which are oppositely arranged 11, with one end of each connected with the steering rocker arm unit and the other end hinged to the frame 1; and a first steering linkage 12 and a second steering linkage 14 which are oppositely arranged, with one end of each connected with the steering rocker arm unit and the other end connected with a knuckle arm 15, the knuckle arm 15 being fixed on a wheel rim 4.

Figure 3:
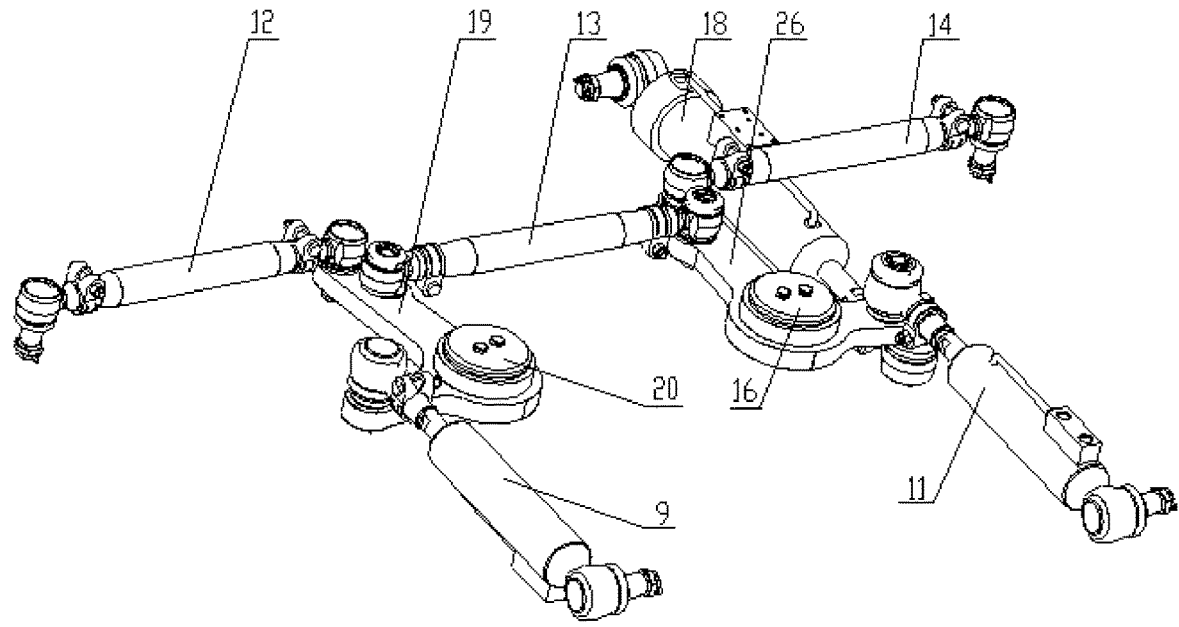
FIG. 3 is a structural diagram of a steering mechanism in a specific implementation of Embodiment 1.

In a specific implementation of the embodiment of the invention, as shown in FIG. 3, when the steering mechanism is a double-rocker arm three-linkage structure, the steering rocker arm unit comprises:

two type I rocker arm brackets (16 and 20) fixed on a lower bottom surface of the frame 1;

a third steering linkage 13; and a first type I steering rocker arm 19 and a second type I steering rocker arm 26, which are respectively connected with two ends of the third steering linkage 13 and the type I rocker arm brackets (16 and 20);

the first type I steering rocker arm 19 is also connected with the first power steering cylinder 9 and the first steering linkage 12;

the second type I steering rocker arm 26 is also connected with the second power steering cylinder 11 and the second steering linkage 14; and the mid-position locking cylinder 18 is connected with the first type I steering rocker arm 19 or the second type I steering rocker arm 26.

Figure 4:
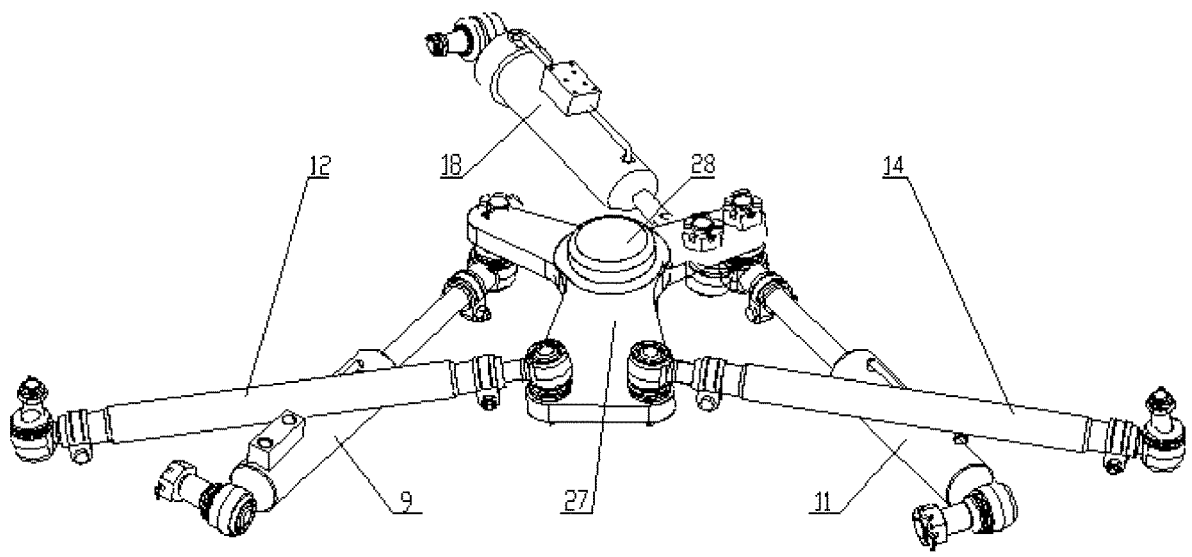
FIG. 4 is a structural diagram of a steering mechanism in another specific implementation of Embodiment 1.

In a specific implementation of the embodiment of the invention, as shown in FIG. 4, when the steering mechanism is a single-rocker arm two-linkage structure, the steering rocker arm unit comprises:

a type II rocker arm bracket 28 fixed on a lower bottom surface of the frame 1; and a type II steering rocker arm 27 connected with the type II rocker arm bracket 28, two ends of one side of the type II steering rocker arm being respectively connected with the first power steering cylinder 9 and the first steering linkage 12, and two ends of the other side being respectively connected with the second power steering cylinder 11 and the second steering linkage 14; and the mid-position locking cylinder 18 is connected with the type II steering rocker arm 27.

The mid-position locking cylinder in the steering mechanism can also be a mechanical steering linkage, and the arrangement positions of the first power steering cylinder, the second power steering cylinder and the mid-position locking cylinder are not fixed and are not limited to those shown in FIG. 3 and FIG. 4. The first power steering cylinder, the second power steering cylinder and the mid-position locking cylinder can all be mounted on the type I steering rocker arm or the type II steering rocker arm, or on the knuckle arm of the wheel rim, or can be separately mounted on the type I steering rocker arm or the type II steering rocker arm and the knuckle arm. All similar arrangements are within the protection scope of this application. The type I rocker arm bracket and the type II rocker arm bracket are directly welded or bolted on the lower bottom surface of the frame, and the structures of the type I rocker arm bracket and the type II rocker arm bracket are not limited to those shown in the figures. Any fixing forms allowing the type I steering rocker arm or the type II steering rocker arm to be fixed on the frame without relying on a rocker arm support are within the protection scope of this application.

It can be seen that the steering mechanisms in the above two implementations do not need an additional rocker arm support to fix the rocker arm and bear the bearing reaction of the rocker arm, but only need a small rocker arm bracket to directly fix the steering rocker arm on the frame. In the actual use process, the steering mechanism is located between the lower bottom surface of the frame and the inter-wheel transmission shaft, and a rocker arm sleeve and rocker arm supports are eliminated. This significantly reduces the overall weight, reduces the required space for the steering mechanism, allows for a more compact arrangement of components, simplifies the manufacturing process, and reduces economic costs.

Embodiment 2

Figure 10A:
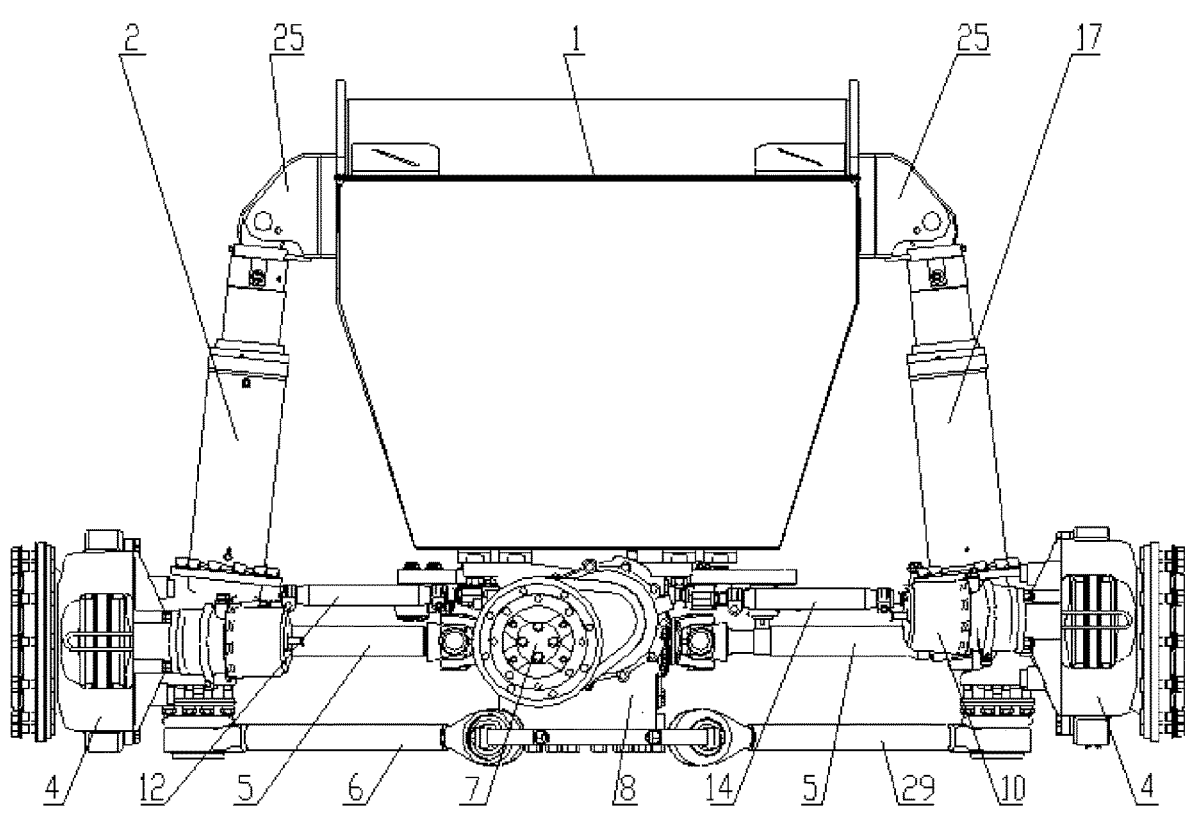
FIG. 10A is a structural diagram of an independent suspension system in a specific implementation of Embodiment 2.
Figure 10B:
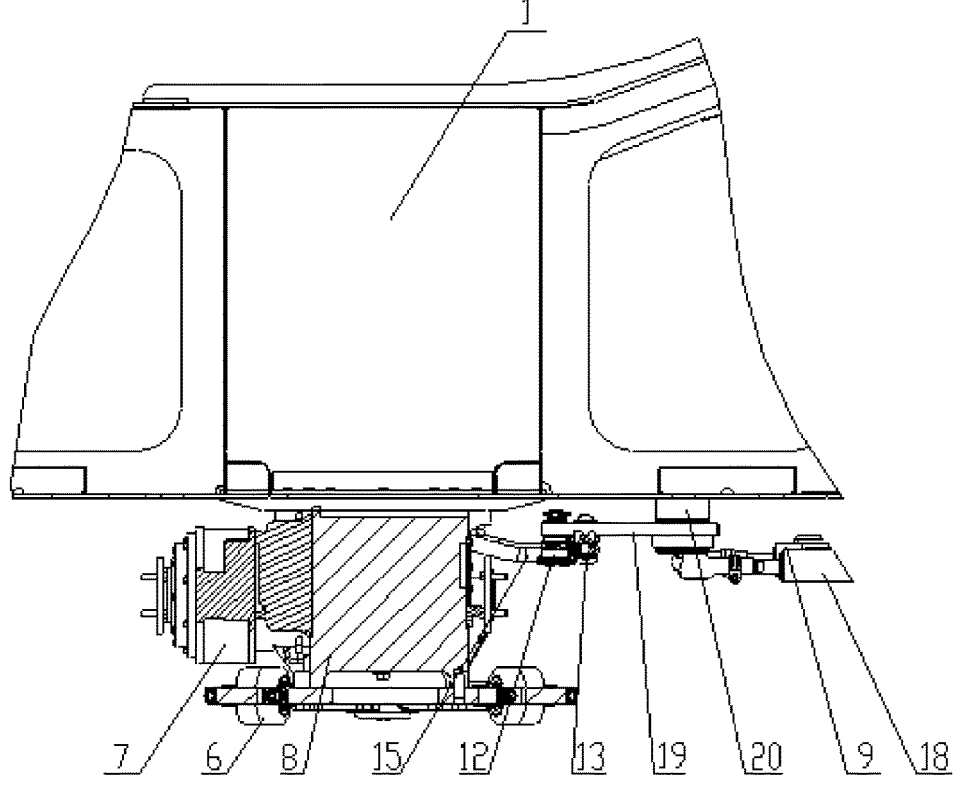
FIG. 10B is a structural diagram of an independent suspension system in a specific implementation of Embodiment 2.

As shown in FIG. 10A and FIG. 10B, the invention provides an independent suspension system, comprising:

a frame 1;

two oppositely arranged wheel rims 4;

two oppositely arranged suspension cylinders (2 and 17), with one end of each connected with the frame 1 and the other end connected with the corresponding wheel rim 4, to lift and lower the frame 1;

an input flange 7 connected with an inter-wheel transmission shaft;

a main reducer connected with the input flange 7 and fixed at a bottom of the frame 1, an output end of the main reducer being connected with the wheel rim 4 through a transmission shaft 5;

a first thrust rod 6 and a second thrust rod 29 which are oppositely arranged, with one end of each connected with the wheel rim 4 and the other end connected with the main reducer, serving the purpose of fixation and positioning; and the steering mechanism as described in any part of Embodiment 1 connected with the wheel rim 4 and the frame 1.

Figure 5:
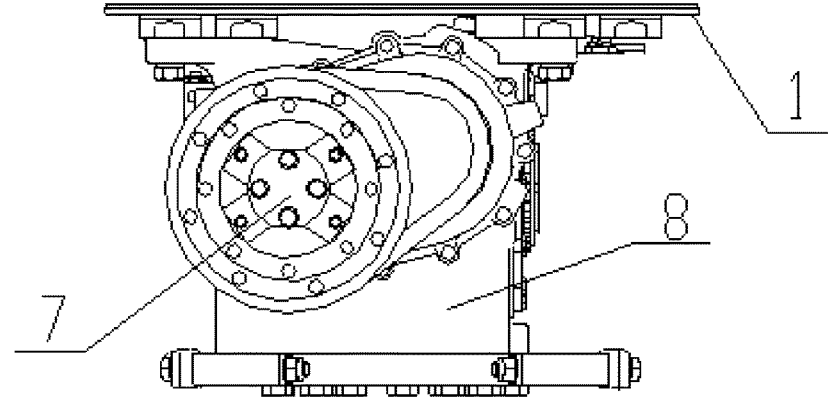
FIG. 5 is an assembly diagram between a main reducer and an input flange in a specific implementation of Embodiment 2.
Figure 6:
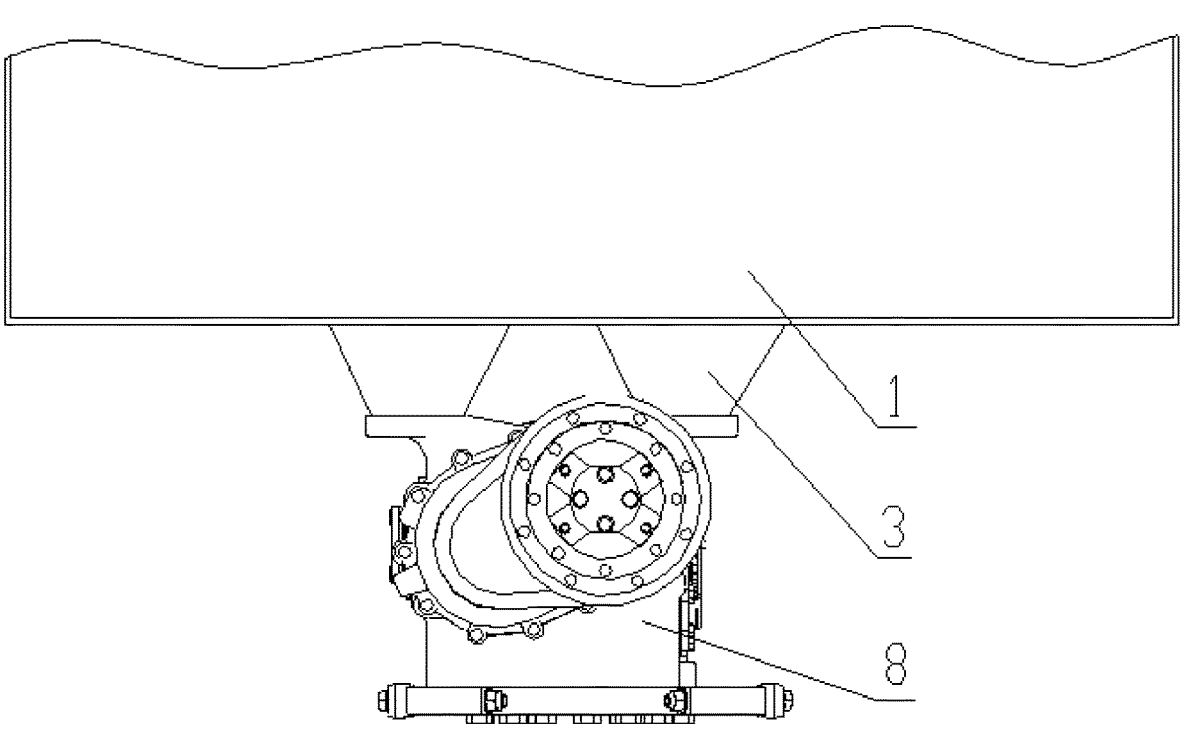
FIG. 6 is an assembly diagram between a main reducer and an input flange in another specific implementation of Embodiment 2.

In a specific implementation of the embodiment of the invention, as shown in FIG. 5, the input flange 7 has a below-center offset, to increase the distance between the inter-wheel transmission shaft and the frame 1, and to ensure that the rotational direction of the inter-wheel transmission shaft and the wheel remains unchanged, so as to reserve enough space for the arrangement of the steering mechanism. In another specific implementation of the embodiment of the invention, as shown in FIG. 6, a main reducer bracket 3 is arranged between the frame 1 and the main reducer 8, to increase the distance between the inter-wheel transmission shaft and the frame 1, and to ensure that the rotational direction of the inter-wheel transmission shaft and the wheel remains unchanged, so as to reserve enough space for the arrangement of the steering mechanism.

In a specific implementation of the embodiment of the invention, as shown in FIG. 3, FIG. 10A and FIG. 10B, when the steering mechanism is a double-rocker arm three-linkage structure, the knuckle arm 15 is fixed between the wheel rim 4 and the suspension cylinder (2 and 17), and one ends of the first power steering cylinder 9, the second power steering cylinder 11 and the mid-position locking cylinder 18 are all hinged to a lower bottom surface of the frame 1; and the type I rocker arm bracket (16 and 20) is fixed on the lower bottom surface of the frame 1.

When steering is required, the mid-position locking cylinder 18 does not work, the first power steering cylinder 9 or the second power steering cylinder 11 controls the first type I steering rocker arm 19 and the second type I steering rocker arm 26 to rotate through expansion and contraction, then the knuckle arms 15 are driven by the first steering linkage 12 and the second steering linkage 14, and then the knuckle arms 15 drive the wheel rims 4 to realize wheel steering; and when a rear axle needs to be locked, the mid-position locking cylinder 18 works to lock the steering mechanism.

In a specific implementation of the embodiment of the invention, as shown in FIG. 4, FIG. 10A and FIG. 10B, when the steering mechanism is a single-rocker arm two-linkage structure, the knuckle arm 15 is fixed between the wheel rim 4 and the suspension cylinder (2 and 17), and one ends of the first power steering cylinder 9, the second power steering cylinder 11 and the mid-position locking cylinder 18 are all hinged to a lower bottom surface of the frame 1; and the type II rocker arm bracket 28 is fixed on the lower bottom surface of the frame 1.

When steering is required, the mid-position locking cylinder 18 does not work, the first power steering cylinder 9 or the second power steering cylinder 11 controls the type II steering rocker arm 27 to rotate through expansion and contraction, then the knuckle arms 15 are driven by the first steering linkage 12 and the second steering linkage 14, and then the knuckle arms 15 drive the wheel rims 4 to realize wheel steering; and when a rear axle needs to be locked, the mid-position locking cylinder 18 works to lock the steering mechanism.

Figure 7:
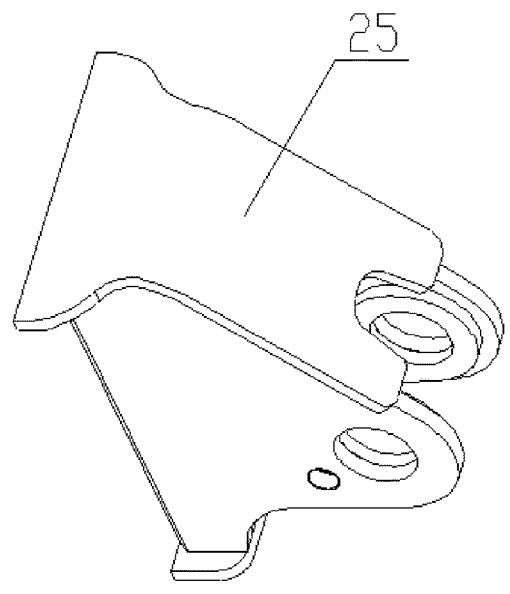
FIG. 7 is a structural diagram of a cylinder bracket in a specific implementation of Embodiment 2.
Figure 8:
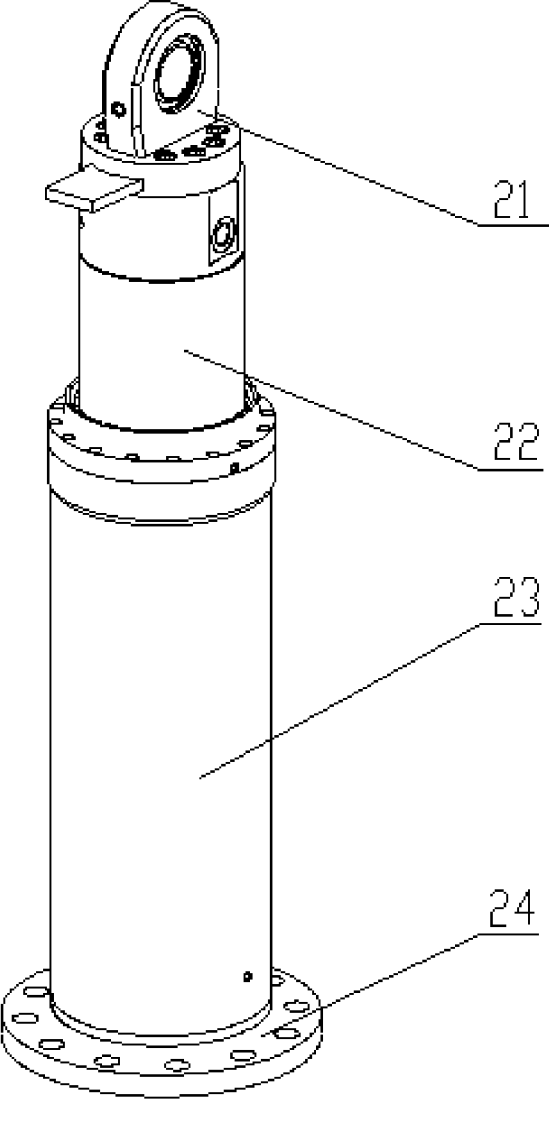
FIG. 8 is a structural diagram of a suspension cylinder in a specific implementation of Embodiment 2.

As shown in FIG. 7 and FIG. 8, in a specific implementation of the embodiment of the invention, the suspension cylinder (2 and 17) comprises an adapter base 21, a cylinder block 22, a sleeve 23 and a foundation 24 which are connected in sequence, a cylinder bracket 25 is hinged to a top of the adapter base 21, the cylinder bracket 25 is connected with the frame 1, and the foundation 24 is connected with the wheel rim 4. In the concrete implementation process, the adapter base 21 is fixed on the cylinder block 22 by bolts. After the enhancement of the connection method between the suspension cylinder and the frame, both the weight and volume of the cylinder bracket are significantly reduced. This also simplifies the structure of the suspension cylinder, reduces assembly difficulty and process complexity, and improves the reliability of the suspension cylinder.

Figure 9A:
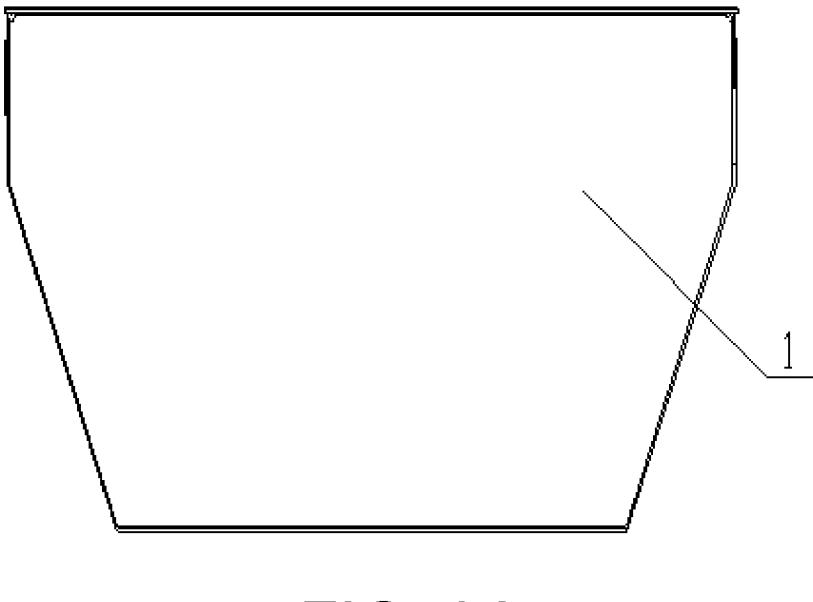
FIG. 9A is a structural diagram of a frame in a specific implementation of Embodiment 2.
Figure 9B:
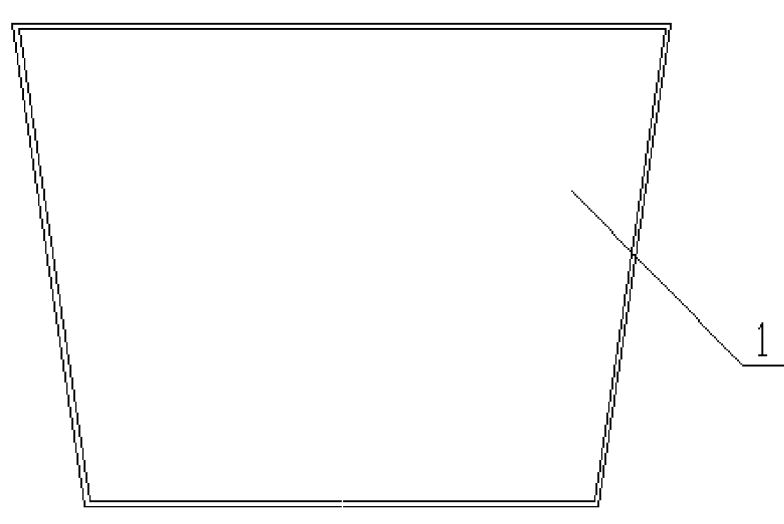
FIG. 9B is a structural diagram of a frame in another specific implementation of Embodiment 2.

As shown in FIG. 9A, in a specific implementation of the embodiment of the invention, a cross section of the frame 1 is in the shape of an irregular polygon. As shown in FIG. 9B, in another specific implementation of the embodiment of the invention, the cross section of the frame 1 is in the shape of an inverted trapezoid. The polygonal frame increases the side area of the frame and creates additional space between the frame and the suspension cylinder, thereby providing sufficient space for hydraulic piping, pneumatic piping, and other systems. It should be pointed out that the shape of the cross section of the frame is not limited to that shown in FIG. 9A and FIG. 9B, and any polygonal shape that is not rectangular is included within the protection scope of this application.

In a specific implementation of the embodiment of the invention, a brake chamber 10 is further connected to the wheel rim 4 for braking.

To sum up, the novel independent suspension system in the embodiment of the invention significantly reduces the overall weight, allows for a more compact arrangement of components, reduces assembly difficulty and process complexity, improves reliability, and reduces economic costs.

The basic principles, main features and advantages of the invention are described above. Those skilled in the art should understand that the invention is not limited by the above-mentioned embodiments. What is described in the above-mentioned embodiments and the description is only to illustrate the principles of the invention. Without departing from the spirit and scope of the invention, the invention will have various changes and improvements, which all fall within the scope of the claimed invention. The protection scope of the invention is defined by the appended claims and their equivalents.

What is claimed is:

1. A steering mechanism, comprising:
a steering rocker arm unit;
a mid-position locking cylinder, wherein one end of the mid-position locking cylinder is connected with the steering rocker arm unit and another end of the mid-position locking cylinder is hinged to a frame;
a first power steering cylinder and a second power steering cylinder which are oppositely arranged, wherein one end of each of the first power steering cylinder and the second power steering cylinder is connected with the steering rocker arm unit, and another end of each of the first power steering cylinder and the second power steering cylinder is hinged to the frame; and
a first steering linkage and a second steering linkage which are oppositely arranged, wherein one end of each of the first steering linkage and the second steering linkage is connected with the steering rocker arm unit, another end of each of the first steering linkage and the second steering linkage is connected with at least one knuckle arm, and the at least one knuckle arm is fixed on a wheel rim.

2. The steering mechanism according to claim 1, wherein when the steering mechanism is a double-rocker arm three-linkage structure, the steering rocker arm unit comprises:
two type I rocker arm brackets fixed on a lower bottom surface of the frame;
a third steering linkage; and
a first type I steering rocker arm and a second type I steering rocker arm, which are respectively connected with two ends of the third steering linkage and are respectively connected with the two type I rocker arm brackets;
the first type I steering rocker arm is connected with the first power steering cylinder and the first steering linkage;
the second type I steering rocker arm is connected with the second power steering cylinder and the second steering linkage; and
the mid-position locking cylinder is connected with the first type I steering rocker arm or the second type I steering rocker arm.

3. The steering mechanism according to claim 1, wherein when the steering mechanism is a single-rocker arm two-linkage structure, the steering rocker arm unit comprises:
a type II rocker arm bracket fixed on a lower bottom surface of the frame; and
a type II steering rocker arm connected with the type II rocker arm bracket, wherein two ends of one side of the type II steering rocker arm are respectively connected with the first power steering cylinder and the first steering linkage, and two ends of another side of the type II steering rocker arm are respectively connected with the second power steering cylinder and the second steering linkage; and
the mid-position locking cylinder is connected with the type II steering rocker arm.

4. An independent suspension system, comprising:
a frame;
two wheel rims that are oppositely arranged;
two suspension cylinders that are oppositely arranged, wherein one end of each of the two suspension cylinders is connected with the frame, and another end of each of the two suspension cylinders is connected with a corresponding one of the two wheel rims;
an input flange connected with an inter-wheel transmission shaft;

a main reducer connected with the input flange and fixed at a bottom of the frame, wherein an output end of the main reducer is connected with the two wheel rims through a transmission shaft;
a first thrust rod and a second thrust rod which are oppositely arranged, wherein one end of each of the first thrust rod and the second thrust rod is connected with one of the two wheel rims, and another end of each of the first thrust rod and the second thrust rod is connected with the main reducer; and
the steering mechanism according to claim 2, connected with the wheel rims and the frame.

5. The independent suspension system according to claim 4, wherein the input flange has a below-center offset to increase the distance between the inter-wheel transmission shaft and the frame; or a main reducer bracket is arranged between the frame and the main reducer to increase the distance between the inter-wheel transmission shaft and the frame.

6. The independent suspension system according to claim 4, wherein when the steering mechanism is a double-rocker arm three-linkage structure, the at least one knuckle arm is fixed between one of the two wheel rims and one of the two the suspension cylinders, and one end of each of the first power steering cylinder, the second power steering cylinder and the mid-position locking cylinder is hinged to a lower bottom surface of the frame; and the two type I rocker arm brackets are fixed on the lower bottom surface of the frame.

7. The independent suspension system according to claim 6, wherein when wheel steering is required, the mid-position locking cylinder does not work, the first power steering cylinder or the second power steering cylinder controls the first type I steering rocker arm and the second type I steering rocker arm to rotate through expansion and contraction, then the at least one knuckle arm is driven by the first steering linkage and the second steering linkage, and then the at least one knuckle arm drives the two wheel rims to realize wheel steering; and when a rear axle needs to be locked, the mid-position locking cylinder works to lock the steering mechanism.

8. An independent suspension system, comprising:
a frame;
two wheel rims that are oppositely arranged;
two suspension cylinders that are oppositely arranged, wherein one end of each of the two suspension cylinders is connected with the frame, and another end of each of the two suspension cylinders is connected with a corresponding one of the two wheel rims;
an input flange connected with an inter-wheel transmission shaft;
a main reducer connected with the input flange and fixed at a bottom of the frame, wherein an output end of the main reducer is connected with the two wheel rims through a transmission shaft;
a first thrust rod and a second thrust rod which are oppositely arranged, wherein one end of each of the first thrust rod and the second thrust rod is connected with one of the two wheel rims, and another end of each of the first thrust rod and the second thrust rod is connected with the main reducer; and
the steering mechanism according to claim 3, connected with the wheel rims and the frame;
when the steering mechanism is a single-rocker arm two-linkage structure, the at least one knuckle arm is fixed between one of the two wheel rims and one of the two suspension cylinders, and one end of each of the first power steering cylinder, the second power steering cylinder and the mid-position locking cylinder is all hinged to a lower bottom surface of the frame; and the type II rocker arm bracket is fixed on the lower bottom surface of the frame.

9. The independent suspension system according to claim 8, wherein when wheel steering is required, the mid-position locking cylinder does not work, the first power steering cylinder or the second power steering cylinder controls the type II steering rocker arm to rotate through expansion and contraction, then the at least one knuckle arm is driven by the first steering linkage and the second steering linkage, and then the at least one knuckle arm drives the two wheel rims to realize wheel steering; and when a rear axle needs to be locked, the mid-position locking cylinder works to lock the steering mechanism.

10. The independent suspension system according to claim 4, wherein each of the two suspension cylinders comprises an adapter base, a cylinder block, a sleeve and a foundation which are connected in sequence, a cylinder bracket is hinged to a top of the adapter base, the cylinder bracket is connected with the frame, and the foundation is connected with one of the two wheel rims.

11. The independent suspension system according to claim 4, wherein a cross section of the frame is in a shape of an inverted trapezoid or irregular polygon.

\* \* \* \* \*